United States Patent
Han et al.

(10) Patent No.: US 11,907,290 B2
(45) Date of Patent: *Feb. 20, 2024

(54) ELECTRONIC DEVICE AND CONTROL METHOD THEREOF

(71) Applicant: Samsung Electronics Co., Ltd., Suwon-si (KR)

(72) Inventors: Jiwan Han, Suwon-si (KR); Hangyul Kim, Suwon-si (KR); Miji Park, Suwon-si (KR); Sunyoung Park, Suwon-si (KR); Chunhyoung Park, Suwon-si (KR); Jiyoung Shin, Suwon-si (KR); Younghak Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,749

(22) Filed: Nov. 10, 2022

(65) Prior Publication Data

US 2023/0065006 A1 Mar. 2, 2023

Related U.S. Application Data

(63) Continuation of application No. 16/835,828, filed on Mar. 31, 2020, now Pat. No. 11,531,701.

(30) Foreign Application Priority Data

Apr. 3, 2019 (KR) .......................... 10-2019-0039012

(51) Int. Cl.
*G06F 16/738* (2019.01)
*G06F 16/783* (2019.01)
(Continued)

(52) U.S. Cl.
CPC .......... *G06F 16/739* (2019.01); *G06F 16/735* (2019.01); *G06F 16/7847* (2019.01);
(Continued)

(58) Field of Classification Search
None
See application file for complete search history.

(56) References Cited

U.S. PATENT DOCUMENTS 6,496,981 B1 12/2002 Wistendahl et al.
7,158,676 B1 1/2007 Rainsford
(Continued)

FOREIGN PATENT DOCUMENTS

CN 105046661 A 11/2015
JP 4799511 B2 8/2011
(Continued)

OTHER PUBLICATIONS

Chinese Office Action dated Jan. 3, 2023, issued in Chinese Application No. 202080040734.6.
(Continued)

*Primary Examiner* — William L Bashore
*Assistant Examiner* — Nathan K Shrewsbury
(74) *Attorney, Agent, or Firm* — Jefferson IP Law, LLP

(57) ABSTRACT

An electronic device is provided. The electronic device includes a display, at least one processor, and at least one memory configured to store instructions that cause the at least one processor to obtain first information from a first still image frame that is included in a first moving image, obtain second information from the first moving image, identify at least one image function based on at least one of the first information or the second information, and control the display to display at least one function execution object for executing the at least one image function. Various other embodiments can be provided.

20 Claims, 11 Drawing Sheets

(51) Int. Cl.
*G06F 16/735* (2019.01)
*H04N 21/2343* (2011.01)

(52) U.S. Cl.
CPC ............... *H04N 21/234318* (2013.01); *H04N 21/234327* (2013.01)

(56) References Cited

U.S. PATENT DOCUMENTS

| | | |
|---|---|---|
| 7,945,142 B2 | 5/2011 | Finkelstein et al. |
| 8,237,815 B2 | 8/2012 | Ikeda |
| 8,413,054 B2 | 4/2013 | Kaplan et al. |
| 9,142,253 B2 | 9/2015 | Ubillos |
| 10,176,366 B1 | 1/2019 | Maxwell |
| 11,531,701 B2* | 12/2022 | Han .................. H04N 1/40 |
| 2002/0056136 A1 | 5/2002 | Wistendahl et al. |
| 2002/0181773 A1 | 12/2002 | Higaki et al. |
| 2003/0068087 A1 | 4/2003 | Wu et al. |
| 2003/0149983 A1 | 8/2003 | Markel |
| 2004/0070622 A1* | 4/2004 | Cossey ................ G06F 9/543 715/769 |
| 2004/0095396 A1 | 5/2004 | Stavely et al. |
| 2005/0163462 A1* | 7/2005 | Pratt .................. G11B 27/11 386/233 |
| 2005/0169367 A1* | 8/2005 | Venetianer ....... G08B 13/19652 375/E7.006 |
| 2006/0090141 A1* | 4/2006 | Loui .................. G06F 16/447 715/764 |
| 2007/0074115 A1 | 3/2007 | Patten et al. |
| 2008/0046920 A1 | 2/2008 | Bill |
| 2009/0006368 A1 | 1/2009 | Mei et al. |
| 2009/0059054 A1 | 3/2009 | Oishi et al. |
| 2009/0070324 A1 | 3/2009 | Yoshino |
| 2009/0077459 A1 | 3/2009 | Morris et al. |
| 2009/0103887 A1 | 4/2009 | Choi et al. |
| 2009/0144623 A1* | 6/2009 | Jung .................. G06F 3/0488 345/173 |
| 2009/0144785 A1* | 6/2009 | Walker ................ H04N 5/262 725/105 |
| 2009/0213270 A1 | 8/2009 | Ismert et al. |
| 2009/0219411 A1* | 9/2009 | Marman ............. H04N 9/8205 348/231.99 |
| 2010/0036875 A1 | 2/2010 | Miezianko et al. |
| 2010/0169786 A1* | 7/2010 | O'Brien ............ G06F 16/745 715/744 |
| 2010/0235746 A1* | 9/2010 | Anzures ............ G06F 3/04883 715/863 |
| 2010/0259645 A1 | 10/2010 | Kaplan et al. |
| 2010/0260466 A1* | 10/2010 | Shima .................. H04N 5/147 386/278 |
| 2011/0067061 A1 | 3/2011 | Karaoguz et al. |
| 2011/0102637 A1 | 5/2011 | Lasseson |
| 2011/0305437 A1* | 12/2011 | Sakaguchi ............ H04N 1/215 386/278 |
| 2012/0078899 A1 | 3/2012 | Fontana et al. |
| 2012/0096356 A1 | 4/2012 | Ubillos et al. |
| 2012/0163657 A1 | 6/2012 | Shellshear |
| 2012/0219271 A1* | 8/2012 | Vunic .................. G06V 20/49 704/235 |
| 2012/0293687 A1 | 11/2012 | Karn et al. |
| 2012/0311636 A1 | 12/2012 | Hill et al. |
| 2013/0091432 A1 | 4/2013 | Shet et al. |
| 2013/0173531 A1 | 7/2013 | Rinearson et al. |
| 2013/0254816 A1 | 9/2013 | Kennedy et al. |
| 2013/0307792 A1* | 11/2013 | Andres ............... G06F 3/04847 345/173 |
| 2014/0023341 A1 | 1/2014 | Wang et al. |
| 2014/0026053 A1 | 1/2014 | Huang et al. |
| 2014/0146877 A1 | 5/2014 | Delegue et al. |
| 2014/0149893 A1 | 5/2014 | Raichelgauz et al. |
| 2014/0195916 A1 | 7/2014 | Kwon et al. |
| 2014/0334797 A1 | 11/2014 | Lee et al. |
| 2015/0286376 A1* | 10/2015 | Tijssen .................. G11B 27/34 345/474 |
| 2016/0019425 A1 | 1/2016 | Yamaji |
| 2016/0092561 A1 | 3/2016 | Liu et al. |
| 2016/0112727 A1 | 4/2016 | Mate et al. |
| 2016/0142794 A1 | 5/2016 | Yoo et al. |
| 2016/0234464 A1 | 8/2016 | Loce et al. |
| 2016/0360098 A1 | 12/2016 | King et al. |
| 2016/0365116 A1* | 12/2016 | Galant ................ G06F 3/04845 |
| 2017/0302970 A1 | 10/2017 | Dudko et al. |
| 2018/0025079 A1 | 1/2018 | Xiao et al. |
| 2018/0089203 A1 | 3/2018 | Soni et al. |
| 2018/0132006 A1* | 5/2018 | Galant ................ G11B 27/105 |
| 2018/0139408 A1 | 5/2018 | Fetman |
| 2018/0188916 A1 | 7/2018 | Lyons et al. |
| 2018/0338167 A1 | 11/2018 | Chi et al. |
| 2018/0341705 A1 | 11/2018 | Kim et al. |
| 2019/0042585 A1 | 2/2019 | Ploshykhyn |
| 2019/0251364 A1 | 8/2019 | Park et al. |
| 2019/0377955 A1 | 12/2019 | Swaminathan et al. |
| 2020/0320122 A1 | 10/2020 | Han et al. |

FOREIGN PATENT DOCUMENTS

| | | |
|---|---|---|
| JP | 2018/156246 A | 10/2018 |
| KR | 10-2008-0112574 A | 12/2008 |
| KR | 10-2014-0089125 A | 7/2014 |
| KR | 10-2017-0041098 A | 4/2017 |
| KR | 10-2017-0072071 A | 6/2017 |
| KR | 10-2018-0032025 A | 3/2018 |
| KR | 10-2018-0113202 A | 10/2018 |

OTHER PUBLICATIONS

Extended European Search Report dated Aug. 31, 2022, issued in European Application No. 20784798.9.
International Search Report dated Jul. 6, 2020, issued in International Application No. PCT/KR2020/004399.
Montero et al., "A Decision-Theoretic Video Conference System Based on Gesture Recognition," 7th International Conference on Automatic Face and Gesture Recognition (FGR06), 2006, pp. 387-392, doi: 10.1109/FGR.2006.7. (Year: 2006).
Freeman et al., "Computer vision for interactive computer graphics," in IEEE Computer Graphics and Applications, vol. 18, No. 3, pp. 42-53, May-Jun. 1998, doi: 10.1109/38.674971. (Year: 1998).
Chinese Office Action dated May 30, 2023, issued in Chinese Application No. 202080040734.6.
Korean Office Action dated Aug. 17, 2023, issued in Korean Application No. 10 2019 0039012.
Decision of Rejection dated Oct. 7, 2023, issued in Chinese Application No. 202080040734.6.
Indian Office Action dated Nov. 8, 2023, issued in Indian Application No. 202137049531.

* cited by examiner

ELECTRONIC DEVICE AND CONTROL METHOD THEREOF

CROSS-REFERENCE TO RELATED APPLICATION(S)

This application is a continuation application of prior application Ser. No. 16/835,828, filed on Mar. 31, 2020, which is based on and claims priority under 35 U.S.C. § 119(a) of a Korean patent application number 10-2019-0039012, filed on Apr. 3, 2019, in the Korean Intellectual Property Office, the disclosure of each of which is incorporated by reference herein in its entirety.

BACKGROUND

1. Field

The disclosure relates to an electronic device and control method thereof. More particularly, the disclosure relates to an electronic device capable of providing a function corresponding to an image.

2. Description of Related Art

With the widespread use of various electronic devices such as smartphones, tablet personal computers, portable multimedia players, personal digital assistants, laptop personal computers, and wearable devices, there is a growing interest in technology for viewing or editing images using electronic devices.

The user may generate a desired moving image or still image by applying an image correction function, such as correcting a portrait, or inserting text.

When correcting a moving image or still image using an electronic device, the user may be inconvenienced by having to find and determine an image correction function suitable for the image.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device capable of providing an image correction function corresponding to a displayed image.

Additional aspects will be set forth in part in the description which follows and, in part, will be apparent from the description, or may be learned by practice of the presented embodiments.

In accordance with an aspect of the disclosure, an electronic device is provided. The electronic device includes a display, at least one processor, and at least one memory configured to store instructions that cause the at least one processor to: obtain first information from a first still image frame that is included in a first moving image, obtain second information from the first moving image, identify at least one image function based on at least one of the first information or the second information, and control the display to display at least one function execution object for executing the at least one image function.

In accordance with another aspect of the disclosure, a control method for an electronic device is provided. The control method includes obtaining first information from a first still image frame included in a first moving image, obtaining second information from the first moving image, identifying at least one image function based on at least one of the first information or the second information, and displaying at least one function execution object for executing the at least one image function.

According to various embodiments of the disclosure, the electronic device may identify an image correction function suitable for a still image displayed on the display and provide an object for executing the correction function.

According to various embodiments of the disclosure, when playback of a moving image is paused, the electronic device may identify an image correction function suitable for the still image displayed on the display and provide an object for executing the correction function.

According to various embodiments of the disclosure, the electronic device may identify an image correction function suitable for a still image displayed on the display and provide an object for executing the correction function in collaboration with a server.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
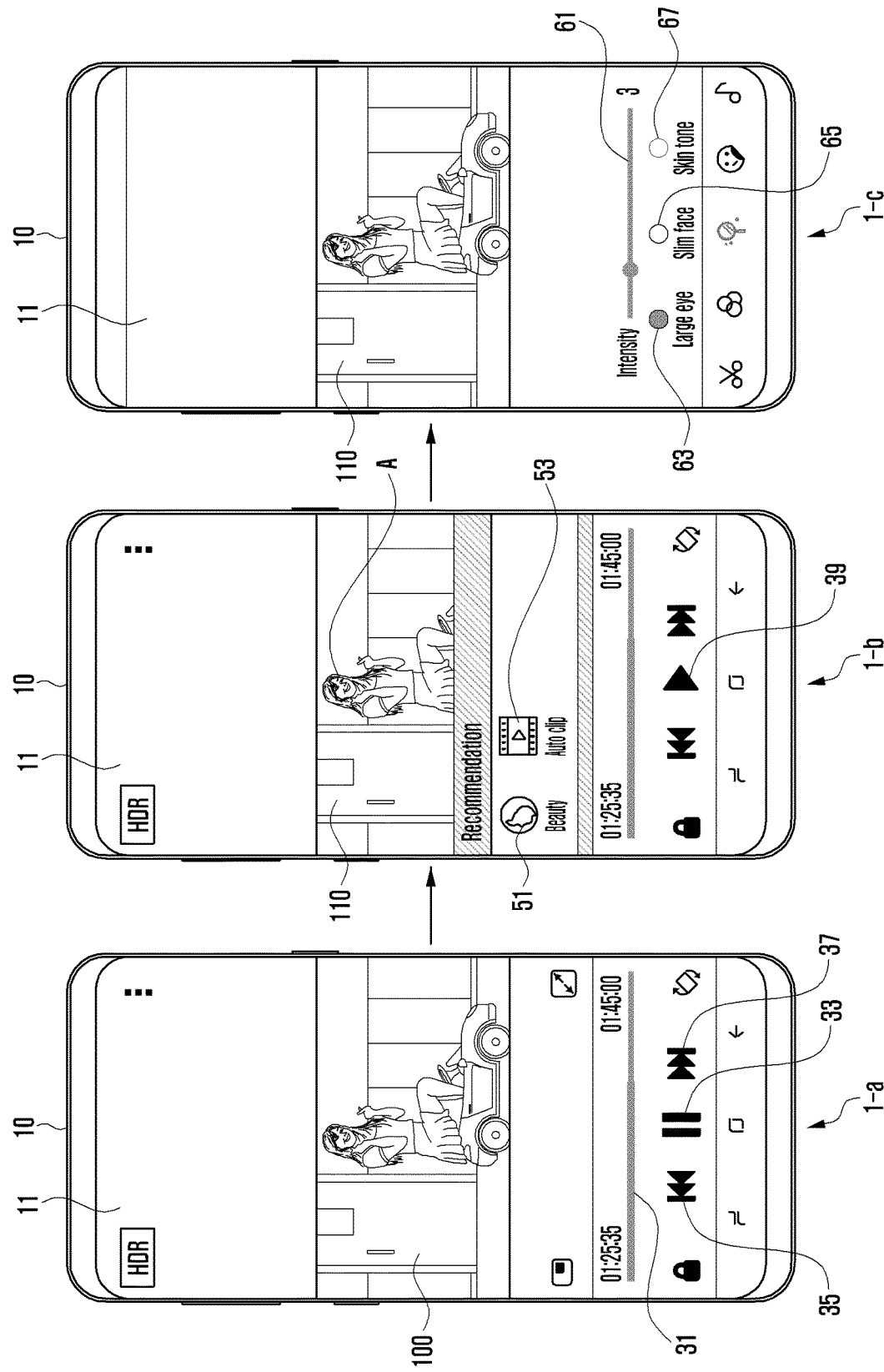
FIG. 1 is a screen representation illustrating a situation where an electronic device displays a function execution object according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, the terms such as "include," "have," "may include" or "may have" denote the presence of stated elements, components, operations, functions, features, and the like, but do not exclude the presence of or a possibility of addition of one or more other elements, components, operations, functions, features, and the like.

In the disclosure, the expression "A or B," "at least one of A and/or B," or "one or more of A and/or B" is intended to include any possible combination of enumerated items. For example, the expression "A or B," "at least one of A and B," or "at least one of A or B" may indicate all of (1) case of including at least one A, (2) case of including at least one B, or (3) case of including both at least one A and at least B.

In the disclosure, expressions such as "1st" or "first," "2nd" or "second," etc. may indicate various elements regardless of their sequence and/or importance and are used merely to distinguish one element from the others. For example, a first user device and a second user device may indicate different user devices regardless of their sequence or importance. For example, without departing from the scope of the disclosure, a first element may be referred to as a second element, and similarly a second element may be also referred to as a first element.

When it is mentioned that a certain (i.e., first) element is "(operatively or communicatively) coupled with/to" or "connected to" another (i.e., second) element, it will be understood that the first element is coupled or connected to the second element directly or via any other (i.e., third) element. On the other hand, when it is mentioned that a certain (i.e., first) element is "directly coupled with/to" or "directly connected to" another (i.e., second) element, any other (i.e., third) element does not exist between the certain element and another.

In the disclosure, the expression "configured to ~" may be interchangeably used with other expressions "suitable for ~," "having the capacity to ~," "designed to ~," "adapted to ~," "made to ~," or "capable of ~." The expression "configured to (or set to) ~" may not necessarily mean "specifically designed to ~" in hardware. Instead, in some situations, the expression a device "configured to ~" may mean that the device is "capable of ~" with other devices or components. For example, a "processor configured to (or set to) perform A, B, and C" may mean a dedicated processor (e.g., an embedded processor) for performing a corresponding operation or a general-purpose processor (e.g., a central processing unit (CPU) or an application processor (AP)) which executes corresponding operations by executing one or more software programs which are stored in a memory device.

Terms used in the disclosure are used only to describe certain embodiments and may not be intended to limit the scope of other embodiments. The singular expressions may include plural expressions unless the context clearly dictates otherwise. Terms used herein, including technical or scientific terms, may have the same meaning as commonly understood by one of ordinary skill in the art. Among terms used herein, terms defined in a generic dictionary may be interpreted as having the same or similar meaning as the contextual meanings of the related art and, unless explicitly defined herein, may not be interpreted as ideally or excessively formal sense. In some cases, terms, even defined herein, are not construed to exclude embodiments of the disclosure.

According to various embodiments of the disclosure, an electronic device may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a moving picture experts group (MPEG-1 or MPEG-2) audio layer 3 (MP3) player, a medical device, a camera, or a wearable device. The wearable device may include at least one of an appcessory type device (e.g., a watch, a ring, a bracelet, an anklet, a necklace, glasses, contact lens, and head-mounted-device (HMD), a textile or clothes-integrated device (e.g., electronic clothes), a body-attached device (e.g., skin pad and tattoo), or a bio-implantable circuit.

In a certain embodiment, the electronic device may be home appliance including at least one of television (TV), a digital video disc (DVD) player, an audio player, an air conditioner, a cleaner, an oven, a microwave oven, a washing machine, an air cleaner, a set-top box, a home automation control panel, a security control panel, a media box (e.g., Samsung HomeSync™, Apple TV™, or Google TV™), game consoles (e.g., Xbox™, PlayStation™), an electronic dictionary, an electronic key, a camcorder, or an electronic frame.

Now, an electronic device according to various embodiments will be described in detail with reference to the accompanying drawings. In the disclosure, the term "user" may denote a person who uses the electronic device or a device (e.g., artificial intelligent electronic device) which uses the electronic device.

FIG. 1 is a screen representation illustrating a situation where an electronic device displays a function execution object according to an embodiment of the disclosure.

Referring to FIG. 1, part 1-a illustrates that an electronic device 10 may reproduce a moving image 100 on the display 11.

In one embodiment, the electronic device 10 may reproduce the moving image 100 by using a moving image file previously stored in the memory of the electronic device 10. Alternatively, the electronic device 10 may receive a moving image file in a streaming form from a connected server and reproduce the moving image 100.

In one embodiment, the electronic device 10 may display various objects (i.e., icons) control playback on the display 11. For example, the electronic device 10 may display, on the display 11, a progress bar 31 indicating the full playback time (e.g., a slider) and the current playback point (e.g., a cursor disposed on the slider), a playback stop object 33, a backward object 35, or a forward object 37. The playback stop object 33 may be displayed when the electronic device 10 plays back a moving image, and the playback start object 39 may be displayed when the playback is paused or stopped.

In one embodiment, the electronic device 10 may pause the playback of the moving image 100 in response to an external input (e.g., a user input) for selecting the playback stop object 33. In this case, the electronic device 10 may pause the playback of the moving image 100 while displaying the still image frame 110 that was output on the display 11 at the time of receiving the external input for selecting the playback stop object 33.

Referring to part 1-b of FIG. 1, the electronic device 10 may pause the playback of the moving image 100 and display the still image frame 110 on the display 11 in response to a user input for selecting the playback stop object 33. When the playback of the moving image 100 is paused, the electronic device 10 may display the playback start object 39 on the display 11 in place of the playback stop object 33.

In one embodiment, when the playback of the moving image is stopped, the electronic device 10 may obtain first information or second information. However, the situation where the electronic device 10 obtains the first information or the second information is not limited thereto.

In one embodiment, the electronic device 10 may obtain the first information from the still image frame 110 displayed on the display 11. The first information may include, for example, a scene recognition result of the still image frame output on the display 11. The scene recognition result may include, for example, a human recognition result of recognizing a person included in the still image frame, an object recognition result of recognizing a shape included in the still image frame, or a place recognition result of recognizing a geographical region included in the still image frame.

The first information may also include, for example, the shooting time of the still image frame output on the display 11, or the result of comparison between the still image frame output on the display 11 and at least one still image frame preceding the still image frame output on the display 11 or at least one still image frame following the still image frame output on the display 11. The comparison result may indicate, for example, the movement of a person or object detected in the still image frame. However, the first information is not limited thereto.

In one embodiment, the electronic device 10 may obtain the second information from the moving image 100. The second information may include, for example, information regarding the shooting time (e.g., shooting start time, shooting end time), the shooting location, the playback duration, the shooting format, the file name, the resolution, or the frame rate of the moving image 100. However, the second information is not limited thereto.

In one embodiment, the electronic device 10 may identify at least one image related function by using at least one of the first information or the second information. The electronic device 10 may display, on the display 11, at least one function execution object for executing the identified at least one image related function.

For example, the electronic device 10 may identify person A as a result of scene recognition of the still image frame 110. The electronic device 10 may display, on the display 11, an image correction execution object (portrait correction execution object (e.g., beauty) 51) for executing an image correction function to correct the face of person A. The electronic device 10 may also display, on the display 11, an image generation execution object (e.g., auto clip) 53 that can generate a new moving image by extracting still image frames where person A is present from among the still image frames included in the moving image 100.

In one embodiment, the electronic device 10 may execute a corresponding function in response to a user input for selecting a function execution object. Referring to part 1-c of FIG. 1, the electronic device 10 may display, on the display 11, adjustment objects (or icons) for adjusting the portrait correction in detail in response to a user input for selecting the portrait correction execution object (e.g., beauty) 51.

For example, the electronic device 10 may display, on the display 11, a correction level setting bar (e.g., intensity) 61, an eye correction object (e.g., large eye) 63, a face correction object (e.g., slim face) 65, and a skin tone correction object (e.g., skin tone) 67. The user may easily correct the still image frame 110 including person A output on the display 11 by using the adjustment objects 61, 63, 65 and 67 for portrait correction.

In various embodiments, in response to a user input for selecting a portrait correction execution object (e.g., beauty) 51, the electronic device 10 may directly apply the portrait correction effect to the still image frame 110 without displaying the adjustment objects for adjusting the portrait correction in detail. For example, the electronic device 10 may display an image on which the skin tone correction effect is applied to person A.

In various embodiments, the electronic device 10 may apply a portrait correction effect to the moving image 100 in response to a user input for selecting a portrait correction execution object (e.g., beauty) 51. For example, the electronic device 10 may identify a still image frame where person A is present among the still image frames included in the moving image 100. The electronic device 10 may identify a still image frame where person A is present while the moving image 100 is not played back. Alternatively, the electronic device 10 may identify a still image frame where person A is present while the moving image 100 is being played back. The electronic device 10 may play back the moving image 100 while applying a portrait correction effect to the face of person A included in each still image frame where person A appears.

As described above, the electronic device 10 according to an embodiment of the disclosure may provide the user with a function execution object that can apply a correction effect to a person appearing in a still image frame based on a human recognition result.

Figure 2:
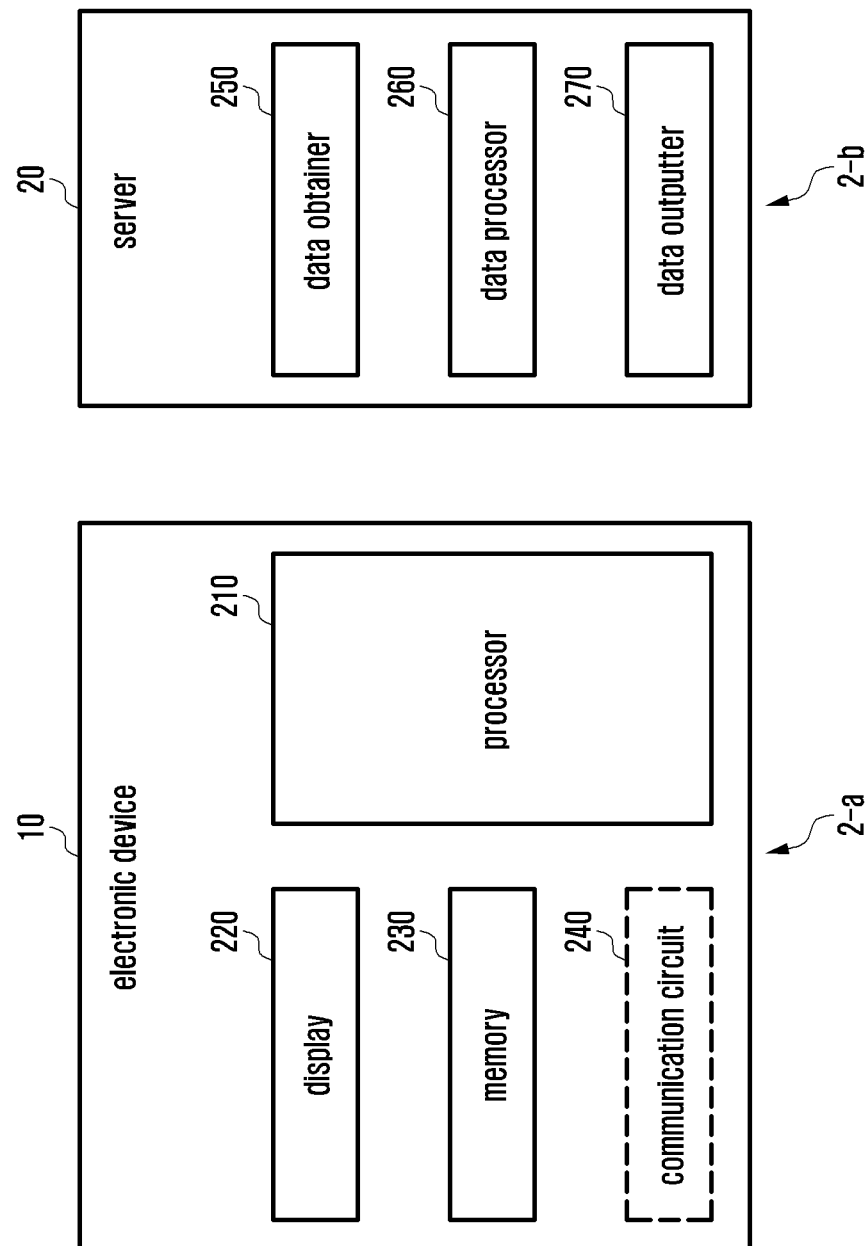
FIG. 2 is a schematic block diagram of an electronic device and a server according to an embodiment of the disclosure.

FIG. 2 is a schematic block diagram of an electronic device and a server according to an embodiment of the disclosure.

Referring to part 2-*a* of FIG. 2, the electronic device 10 may include a processor 210, a display 220, and a memory 230. However, the electronic device 10 is not limited thereto. The electronic device 10 may further include a component or may not include one of the components. For example, the electronic device 10 may further include a communication circuit 240 to establish communication with the server 20.

In one embodiment, the memory 230 may store various operating systems (OS) for controlling the electronic device 10, various software programs (or applications) to support user functions, and data and instructions for operating the electronic device 10. At least some of these programs may be downloaded from an external server via wireless or wired communication. The memory 230 may be implemented using a nonvolatile memory, a volatile memory, a flash memory, a hard disk drive (HDD), or a solid state drive (SSD). The memory 230 is accessed by the processor 210 and its data may be processed by operations of the processor 210 such as read, write, modify, delete, and update.

In one embodiment, the memory 230 may store instructions that are configured to obtain first information from a still image frame included in a moving image, obtain second information from the moving image, identify at least one image related function by using at least one of the first information or the second information, and display at least one function execution object for executing the identified image related function.

In one embodiment, the display 220 may display various content under the control of the processor 210. The display 220 of FIG. 2 may include the display 11 of FIG. 1. The display 220 may display an image (e.g., moving image or still image), text, and/or an execution screen of an application. When the display 220 is implemented as a touchscreen display, the display 220 may be used as an input device in addition to an output device.

In one embodiment, the processor 210 may control the components of the electronic device 10 described above. For example, the processor 210 may use a plurality of applications stored in the memory 230 to obtain a feature of an image or modify (or correct) the image.

In one embodiment, the processor 210 may copy programs stored in the memory 230 to a random access memory (RAM) to execute various operations. Although the processor 210 is described as including only one CPU, the processor 210 may be implemented using multiple CPUs, a digital signal processor (DSP), or a system on chip (SoC)).

The processor 210 may be implemented using a DSP, a microprocessor, or a timing controller (TCON), which processes digital signals. The processor 210 may include, but not limited to, a CPU, a micro controller unit (MCU), a micro processing unit (MPU), a controller, an AP, a communication processor (CP), or an advanced reduced instruction set (RISC) machine (ARM) processor, or a combination thereof. The processor 210 may also be implemented using a SoC or a large scale integration (LSI) chip, where a processing algorithm is embedded, or may be implemented using a field programmable gate array (FPGA).

In one embodiment, the processor 210 may be configured to obtain first information from a still image frame included in a moving image, obtain second information from the moving image, identify at least one image related function by using at least one of the first information or the second information, and display at least one function execution object for executing the identified image related function.

Referring to part 2-*b* of FIG. 2, the server 20 may include a data obtainer 250, a data processor 260, and a data outputter 270.

In one embodiment, the data obtainer 250 may receive a moving image or a still image frame included in a moving image from an external device.

In one embodiment, the data processor 260 may obtain first information from a still image frame of a moving image. The data processor 260 may obtain second information from the moving image. The data processor 260 may identify an image related function by using at least one of the first information or the second information.

In one embodiment, the data outputter 270 may transmit information about the identified image related function to the external device.

Figure 3:
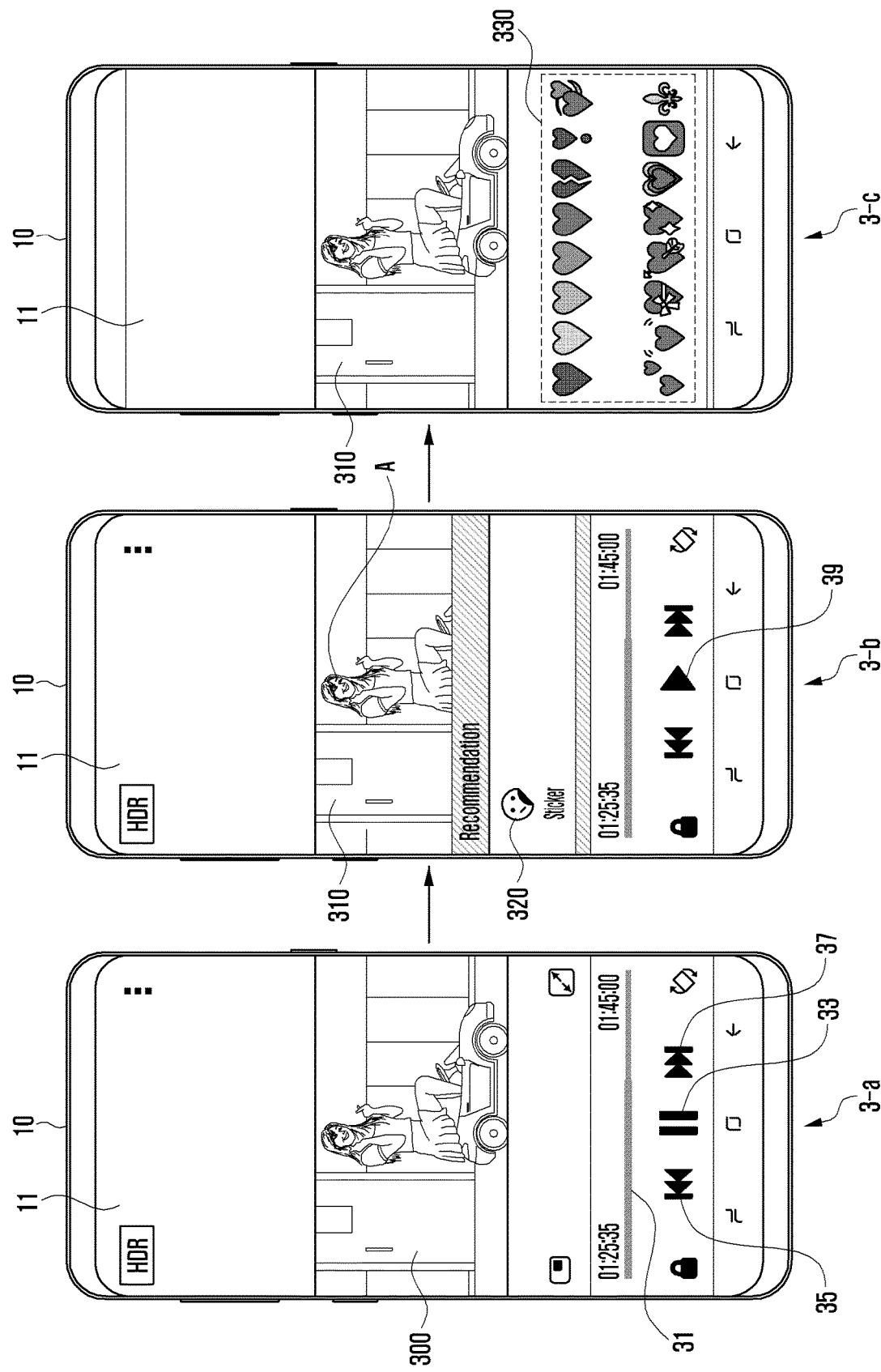
FIG. 3 is a screen representation illustrating a situation where an electronic device displays a function execution object based on object recognition results according to an embodiment of the disclosure.

FIG. 3 is a screen representation illustrating a situation where an electronic device displays a function execution object based on object recognition results according to an embodiment of the disclosure.

Referring to part 3-*a* of FIG. 3, the electronic device 10 may play back a moving image 300 on the display 11.

In one embodiment, the electronic device 10 may display various objects (e.g., icons) for playback control on the display 11. For example, the electronic device 10 may display, on the display 11, a progress bar 31 indicating the full playback time and the current playback point, a playback stop object 33, a backward object 35, or a forward object 37. The playback stop object 33 may be displayed when the electronic device 10 plays back a moving image, and the playback start object 39 may be displayed when the playback is paused or stopped.

In one embodiment, the electronic device 10 may pause the playback of the moving image 300 in response to an external input (or, user input) for selecting the playback stop object 33. In this case, the electronic device 10 may pause the playback of the moving image 300 while displaying the still image frame 310 that was output on the display 11 at the time of receiving the external input for selecting the playback stop object 33.

Referring to part 3-*b* of FIG. 3, the electronic device 10 may pause the playback of the moving image 300 and display the still image frame 310 on the display 11 in response to a user input for selecting the playback stop object 33. When the playback of the moving image 300 is paused, the electronic device 10 may display the playback start object 39 on the display 11 in place of the playback stop object 33.

In one embodiment, when the playback of the moving image is stopped, the electronic device 10 may obtain first information or second information. The electronic device 10 may obtain the first information from the still image frame 310 output on the display 11, and may obtain the second information from the moving image 300.

In one embodiment, the electronic device 10 may identify at least one image related function by using at least one of the first information or the second information. The electronic device 10 may display, on the display 11, at least one function execution object for executing the identified at least one image related function.

For example, the electronic device 10 may identify a finger heart gesture made by person A based on the result of scene recognition of the still image frame 310. The electronic device 10 may display, on the display 11, an icon recommendation execution object (e.g., sticker) 320 that can recommend an icon corresponding to the identified gesture.

In one embodiment, in response to a user input for selecting the icon recommendation execution object 320, the electronic device 10 may execute a corresponding function. Referring to part 3-c of FIG. 3, in response to a user input for selecting the icon recommendation execution object (e.g., sticker) 320, the electronic device 10 may display, on the display 11, icons 330 that can be added to the still image frame. For example, the electronic device 10 may display heart icons 330 on the display 11 based on the recognized object being a finger heart. The electronic device 10 may add the icon selected by the user to the still image frame to display the modified still image frame.

As described above, the electronic device 10 according to an embodiment of the disclosure may provide the user with a function execution object that can add, based on the object recognition result of a still image frame, an icon related to the detected object to the still image frame or moving image.

Figure 4:
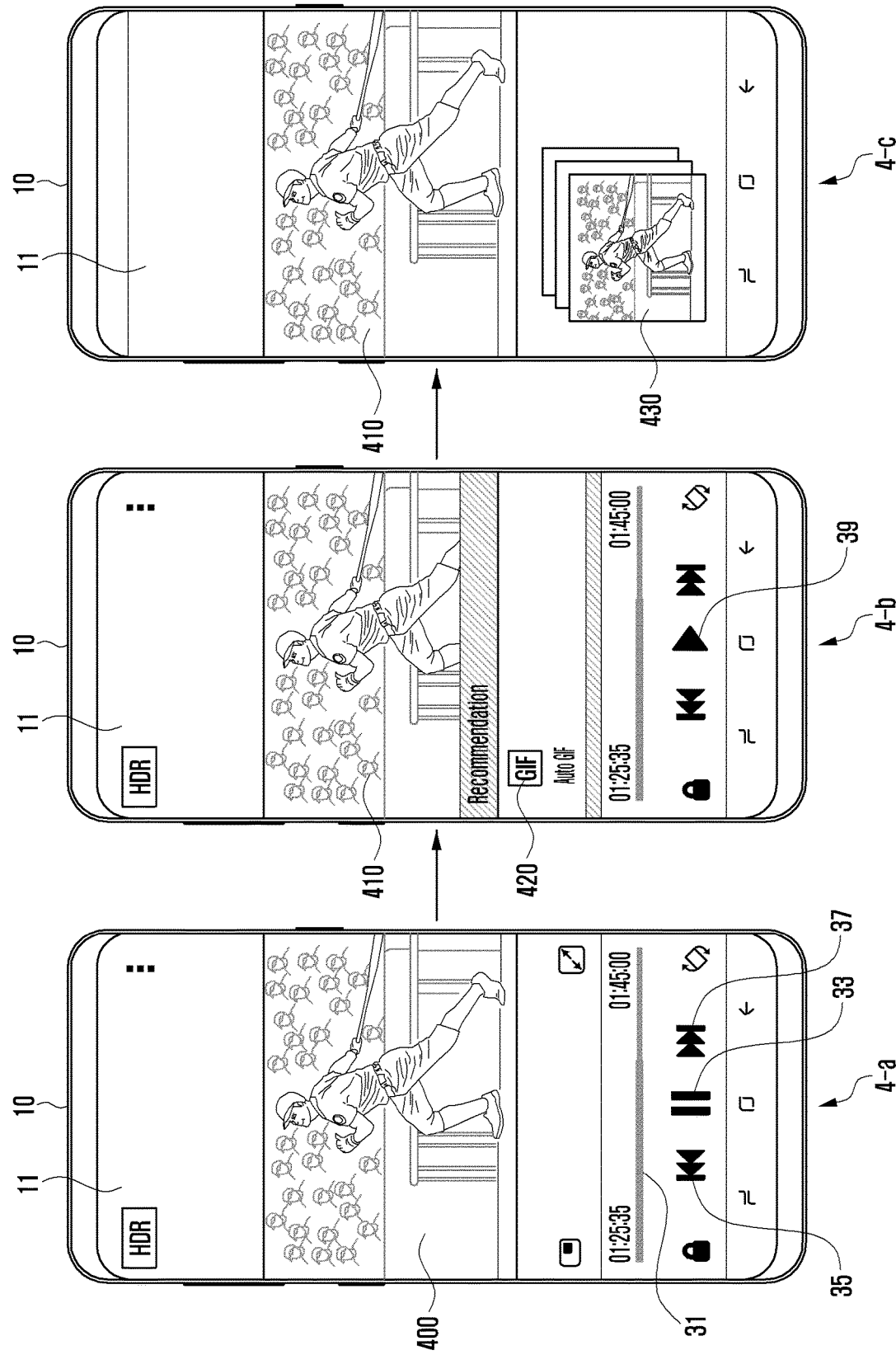
FIG. 4 is a screen representation illustrating a situation where an electronic device displays a function execution object based on results of motion recognition of an object included in a still image according to an embodiment of the disclosure.

FIG. 4 is a screen representation illustrating a situation where an electronic device displays a function execution object based on results of motion recognition of an object included in a still image according to an embodiment of the disclosure.

Referring to part 4-a of FIG. 4, the electronic device 10 may play back a moving image 400 on the display 11.

In one embodiment, the electronic device 10 may display various objects (or, icons) for playback control on the display 11. For example, the electronic device 10 may display, on the display 11, a progress bar 31 indicating the full playback time and the current playback point, a playback stop object 33, a backward object 35, or a forward object 37. The playback stop object 33 may be displayed when the electronic device 10 plays back a moving image, and the playback start object 39 may be displayed when the playback is paused or stopped.

In one embodiment, the electronic device 10 may pause the playback of the moving image 400 in response to an external input (or, user input) for selecting the playback stop object 33. In this case, the electronic device 10 may pause the playback of the moving image 400 while displaying the still image frame 410 that was output on the display 11 at the time of receiving the external input for selecting the playback stop object 33.

Referring to part 4-b of FIG. 4, the electronic device 10 may pause the playback of the moving image 400 and display the still image frame 410 on the display 11 in response to a user input for selecting the playback stop object 33. When the playback of the moving image 400 is paused, the electronic device 10 may display the playback start object 39 on the display 11 in place of the playback stop object 33.

In one embodiment, when the playback of the moving image is stopped, the electronic device 10 may obtain first information or second information. The electronic device 10 may obtain the first information from the still image frame 410 output on the display 11, and may obtain the second information from the moving image 400. In one embodiment, the electronic device 10 may identify at least one image related function by using at least one of the first information or the second information. The electronic device 10 may display, on the display 11, at least one function execution object for executing the identified at least one image related function.

For example, the electronic device 10 may identify that person B is performing a continuous action based on the result of comparison between the still image frame 410 and at least one still image frame preceding the still image frame 410 or at least one still image frame following the still image frame 410. The electronic device 10 may display at least one function execution object according to the scene recognition result.

In part 4-b of FIG. 4, the electronic device 10 may display, on the display 11, a graphics interchange format (GIF) generation execution object (e.g., auto GIF) 420 that can generate a GIF file using a plurality of still image frames.

In one embodiment, in response to a user input for selecting the GIF generation execution object (e.g., auto GIF) 420, the electronic device 10 may execute a corresponding function. For example, the electronic device 10 may generate a GIF file by using the still image frame 410 output on the display 11, two to four still image frames preceding the still image frame 410, and two to four still image frames following the still image frame 410. However, the number of still image frames extracted by the electronic device 10 to generate a GIF file is not limited thereto. For example, the electronic device 10 may determine the number of still image frames extracted to generate a GIF file on the basis of the resolution, codec information, and frame rate of the moving image file, and the resolution of the still image frame.

Referring to part 4-c of FIG. 4, the electronic device 10 may display, on the display 11, a GIF execution object 430 for playing back the generated GIF file. In response to a user input for selecting the GIF execution object 430, the electronic device 10 may play back the GIF file on a portion or the whole of the display 11.

As described above, the electronic device 10 according to an embodiment of the disclosure may provide the user with a function execution object that can generate a GIF file by using the result of scene recognition of plural still image frames and the information obtained from the moving image.

Figure 5:
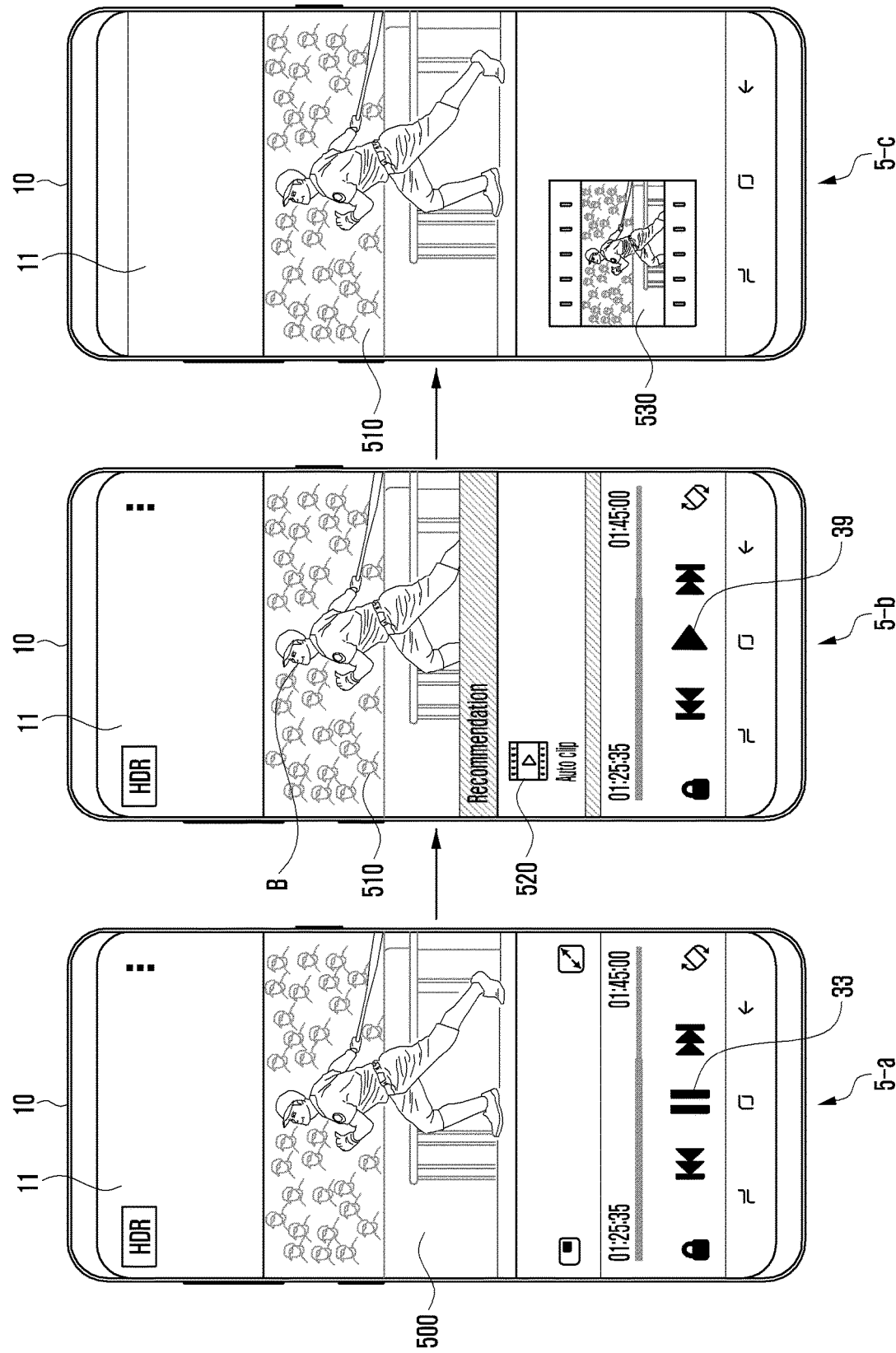
FIG. 5 is a screen representation illustrating another situation where an electronic device displays a function execution object based on results of motion recognition of an object included in a still image according to an embodiment of the disclosure.

FIG. 5 is a screen representation illustrating another situation where an electronic device displays a function execution object based on results of motion recognition of an object included in a still image according to an embodiment of the disclosure.

Part 5-a of FIG. 5 corresponds to part 4-a of FIG. 4, and a description thereof is omitted.

Referring to part 5-b of FIG. 5, in response to a user input for selecting the playback stop object 33, the electronic device 10 may pause the playback of the moving image 500 and display the still image frame 510 on the display 11. When the playback of the moving image 500 is paused, the electronic device 10 may display the playback start object 39 on the display 11 in place of the playback stop object 33.

In one embodiment, when the playback of the moving image is stopped, the electronic device 10 may obtain first information or second information. The electronic device 10 may obtain the first information from the still image frame 510 output on the display 11, and may obtain the second information from the moving image 500. In one embodiment, the electronic device 10 may identify at least one image related function by using at least one of the first information or the second information. The electronic device 10 may display, on the display 11, at least one function execution object for executing the identified at least one image related function.

For example, the electronic device 10 may identify person B as a scene recognition result of the still image frame 510. The electronic device 10 may display, on the display 11, an image generation execution object (e.g., auto clip) 520 that can generate a new moving image by extracting plural still image frames where person B appears.

In one embodiment, in response to a user input for selecting the image generation execution object (e.g., auto clip) 520, the electronic device 10 may execute a corresponding function. For example, the electronic device 10 may generate a moving image file by using the still image frame 510 output on the display 11 and the still image frames of the moving image 500 where person B appears. The electronic device 10 may determine the number of still image frames extracted to generate a new moving image file on the basis of the resolution, codec information, and frame rate of the moving image file, and the resolution of the still image frame.

In various embodiments, the electronic device 10 may generate a new moving image file by using still images received from an external electronic device (e.g., server). For example, the electronic device 10 may use the communication circuit (e.g., communication circuit 240 in FIG. 2) to establish communication with at least one server. The electronic device 10 may request the server to select still images including person B from stored moving images or still images. The electronic device 10 may receive the still images including person B from the server to generate a new moving image file.

Referring to part 5-*c* of FIG. 5, the electronic device 10 may display, on the display 11, an image execution object 530 for playing back the generated moving image file. In response to a user input for selecting the image execution object 530, the electronic device 10 may play back the moving image file on a portion or the whole of the display 11.

As described above, the electronic device 10 according to an embodiment of the disclosure may provide the user with a function execution object that can generate a moving image file by using the result of human recognition of a still image frame and the information obtained from the moving image.

Figure 6:
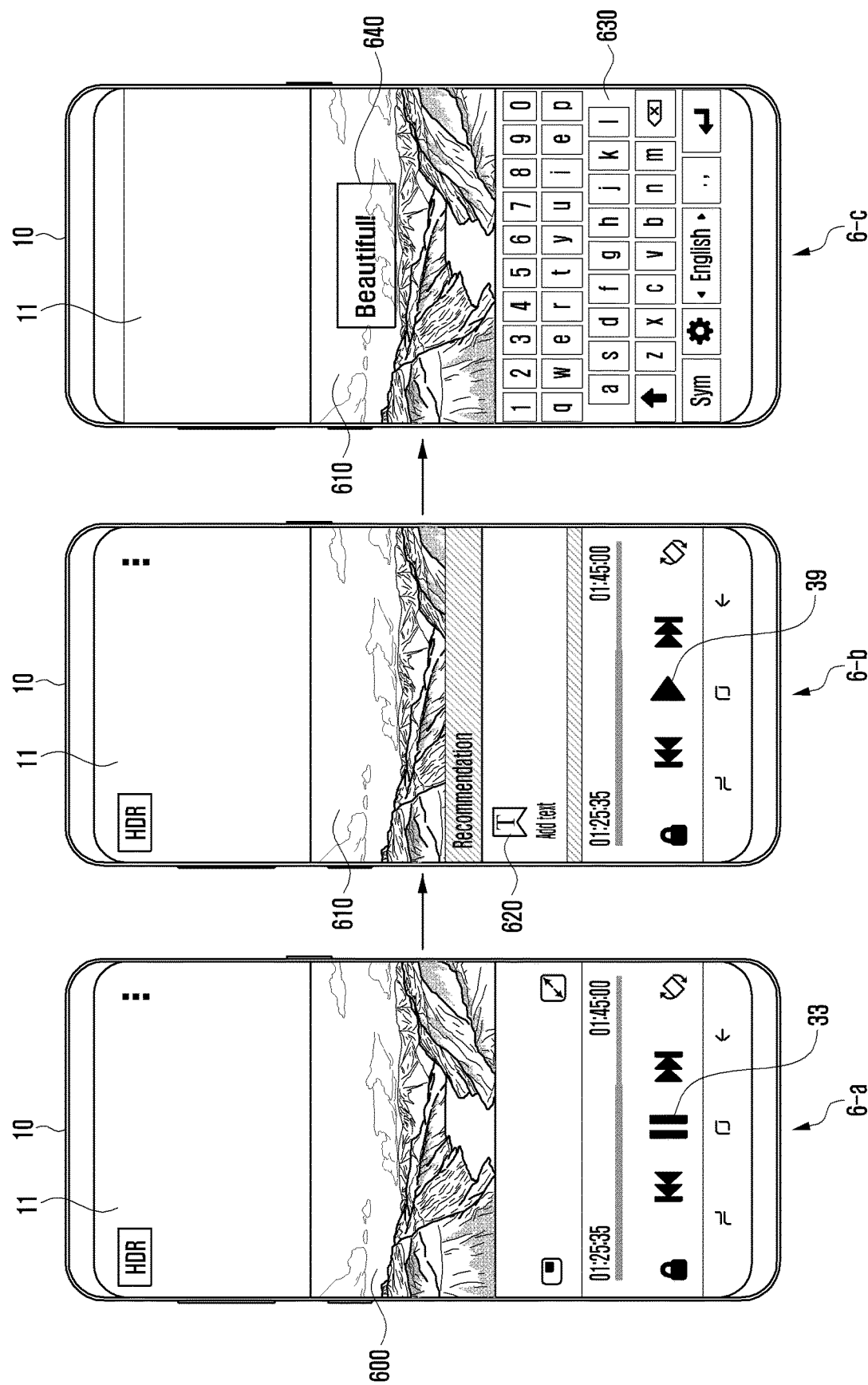
FIG. 6 is a screen representation illustrating a situation where an electronic device displays a function execution object based on a result of recognizing a natural landscape in a still image according to an embodiment of the disclosure.

FIG. 6 is a screen representation illustrating a situation where an electronic device displays a function execution object based on a result of recognizing a natural landscape in a still image according to an embodiment of the disclosure.

Part 6-*a* of FIG. 6 corresponds to part 4-*a* of FIG. 4, and a description thereof is omitted.

Referring to part 6-*b* of FIG. 6, the electronic device 10 may pause the playback of the moving image 600 and display the still image frame 610 on the display 11 in response to a user input for selecting the playback stop object 33. When the playback of the moving image 600 is paused, the electronic device 10 may display the playback start object 39 on the display 11 in place of the playback stop object 33.

In one embodiment, when the playback of the moving image is stopped, the electronic device 10 may obtain first information or second information. The electronic device 10 may obtain the first information from the still image frame 610 output on the display 11, and may obtain the second information from the moving image 600. In one embodiment, the electronic device 10 may identify at least one image related function by using at least one of the first information or the second information. The electronic device 10 may display, on the display 11, at least one function execution object for executing the identified at least one image related function.

For example, the electronic device 10 may identify that the still image frame 610 is a landscape image as a scene recognition result of the still image frame 610. Based on the still image frame 610 being a landscape image, the electronic device 10 may display, on the display 11, a text input execution object (e.g., add text) 620 that can add text to the still image frame 610.

In one embodiment, in response to a user input for selecting the text input execution object (e.g., add text) 620, the electronic device 10 may execute a corresponding function. Referring to part 6-*c* of FIG. 6, the electronic device 10 may display a keyboard 630 for text input on a portion of the display 11. The electronic device 10 may also display a text input box 640 on another portion of the display 11.

In one embodiment, the electronic device 10 may add the text input according to a user input to the still image frame 610 being displayed. The electronic device 10 may change the position, size, or shape of the text input box 640 according to a user input. The electronic device 10 may also change the font or size of the text input to the text input box 640 according to a user input.

As described above, the electronic device 10 according to an embodiment of the disclosure may provide the user with a function execution object that can add text to the still image frame based on the scene recognition result of the still image frame.

Figure 7:
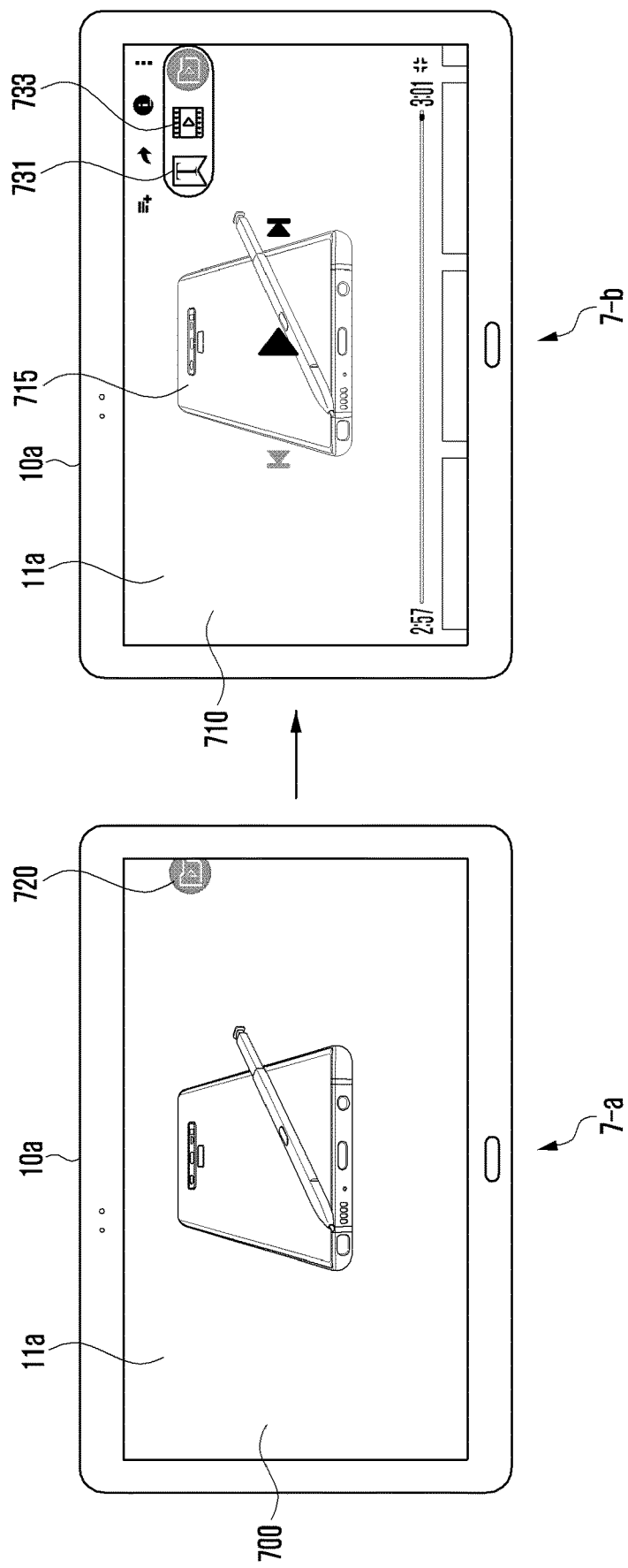
FIG. 7 is a screen representation illustrating a situation where an electronic device displays a shortcut function execution object according to an embodiment of the disclosure.

FIG. 7 is a screen representation illustrating a situation where an electronic device displays a shortcut function execution object according to an embodiment of the disclosure.

Referring to part 7-*a* of FIG. 7, the electronic device 10*a* may play back a moving image 700 on the display 11*a*. The electronic device 10 may not display various objects (or, icons) for playback control on the display 11*a*.

In one embodiment, the electronic device 10*a* may display a shortcut function execution object 720 on a region of the display 11*a*.

For example, the electronic device 10*a* may display the shortcut function execution object 720 in the form of a translucent icon on the display 11*a*. The electronic device 10*a* may move the shortcut function execution object 720 on the display 11*a* in response to a user input for touching and dragging the shortcut function execution object 720.

In one embodiment, in response to a user input for selecting the shortcut function execution object 720, the electronic device 10*a* may display, on the display 11*a*, at least one function execution object that can be provided to the user.

Referring to part 7-*b* of FIG. 7, in response to a user input for selecting the shortcut function execution object 720, the electronic device 10*a* may display function execution objects such as a text input execution object 731 and an image generation execution object 733 on the display 11*a*.

For example, in response to a user input for selecting the shortcut function execution object 720, the electronic device 10*a* may pause the playback of the moving image 700 and display a still image frame 710 on the display 11*a*. The electronic device 10*a* may obtain first information from the still image frame 710 output on the display 11*a*, and may obtain second information from the moving image 700.

For example, the electronic device 10*a* may identify a smartphone-shaped object 715 as the object recognition result of the still image frame 710. The electronic device 10*a* may display, on the display 11*a*, a text input execution object 731 that enables text input about the identified smartphone-shaped object 715.

As another example, the electronic device 10*a* may identify a smartphone-shaped object 715 as the object recognition result of the still image frame 710. The electronic device 10*a* may display, on the display 11*a*, an image generation execution object 733 that can generate a new moving image by extracting plural still image frames where the identified smartphone-shaped object 715 appears.

As described above, the electronic device 10*a* according to an embodiment of the disclosure may display a plurality of function execution objects in a simplified form on the display 11*a* so as to minimize the phenomenon where content output on the display 11*a* is hidden or blocked by objects.

Figure 8:
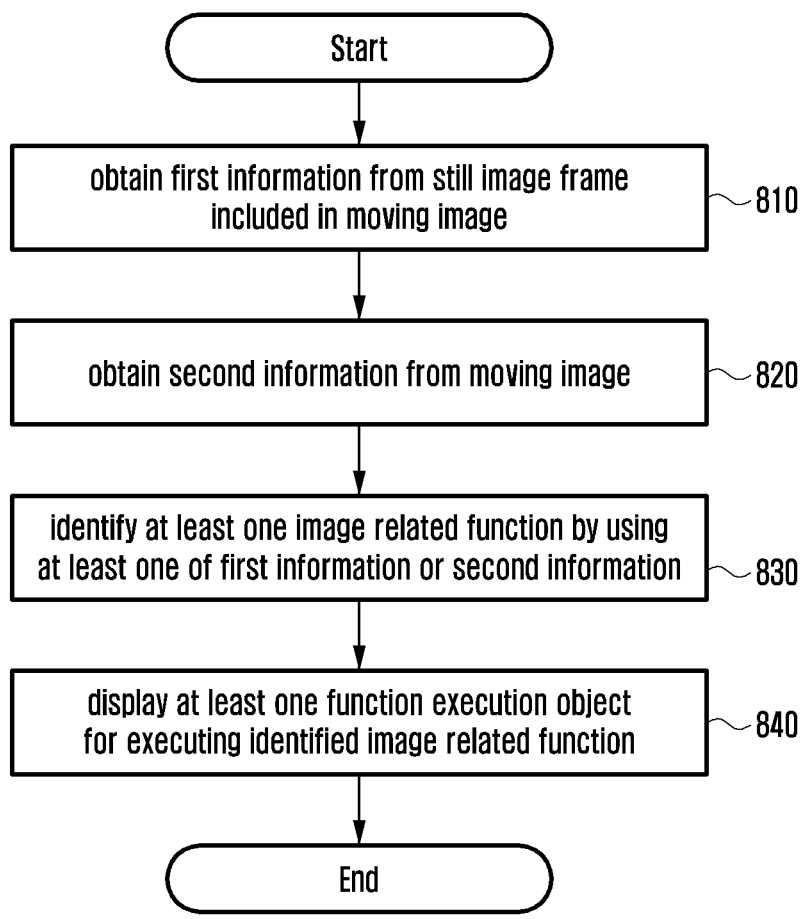
FIG. 8 is a flowchart of a procedure of an electronic device to display a function execution object according to an embodiment of the disclosure.

FIG. 8 is a flowchart of a procedure of an electronic device to display a function execution object according to an embodiment of the disclosure.

Referring to FIG. 8, at operation 810, the electronic device 10 may obtain first information from a still image frame included in the moving image.

In one embodiment, the electronic device 10 may play back a moving image on the display (e.g., display 11 in FIG. 1). In response to an external input, the electronic device 10 may stop the playback of the moving image and display a still image frame on the display 11. For example, when the playback of the moving image is stopped, the electronic device 10 may obtain the first information from the still image frame output on the display 11.

The first information may include, for example, a scene recognition result for the still image frame output on the display 11. The scene recognition result may include, for example, a human recognition result of recognizing a person included in the still image frame, an object recognition result of recognizing a shape included in the still image frame, or a place recognition result of recognizing a geographical region included in the still image frame.

The first information may also include, for example, the shooting time of the still image frame output on the display 11, or the result of comparison between the still image frame output on the display 11 and at least one still image frame preceding the still image frame output on the display 11 or at least one still image frame following the still image frame output on the display 11. The comparison result may indicate, for example, the movement of a person or object detected in the still image frame.

At operation 820, the electronic device 10 may obtain second information from the moving image.

In one embodiment, when the playback of the moving image is stopped, the electronic device 10 may obtain the second information from the moving image. The second information may include, for example, information regarding the shooting time (e.g., shooting start time, shooting end time), the shooting location, the playback duration, the shooting format, the file name, the resolution, or the frame rate of the moving image. However, the second information is not limited thereto.

At operation 830, the electronic device 10 may identify at least one image related function by using at least one of the first information or the second information.

For example, the electronic device 10 may use the human recognition result obtained based on the first information and the resolution of the moving image obtained based on the second information to identify an image generation function that can generate a new moving image by extracting still image frames where the recognized person appears from the moving image.

At operation 840, the electronic device 10 may display at least one function execution object for executing the identified at least one image related function.

For example, the electronic device 10 may display, on the display 11, an image generation execution object for executing the image generation function.

Figure 9:
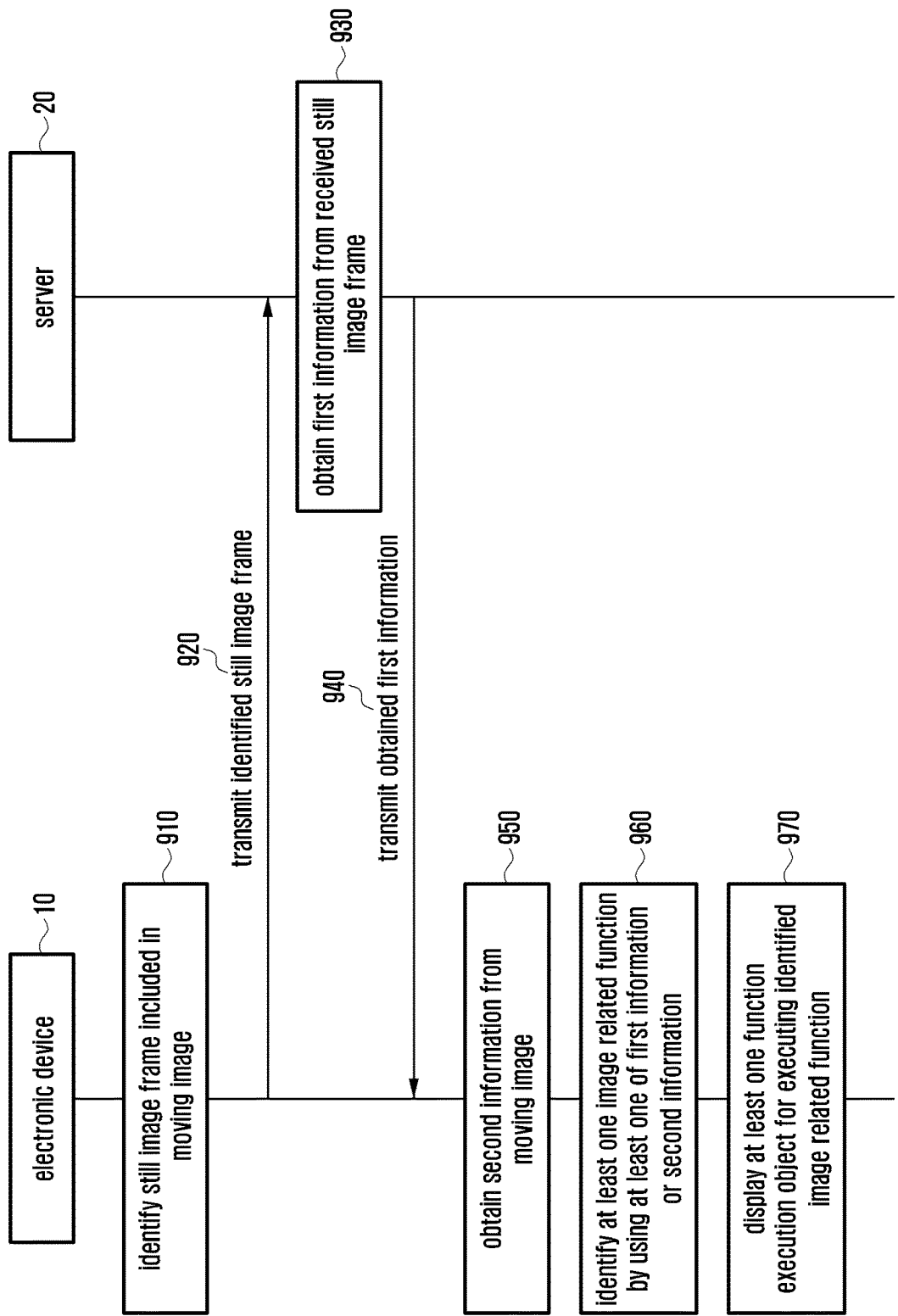
FIG. 9 is a sequence diagram of a procedure of an electronic device to display a function execution object in collaboration with a server according to an embodiment of the disclosure.

FIG. 9 is a sequence diagram of a procedure of an electronic device to display a function execution object in collaboration with a server according to an embodiment of the disclosure.

Referring to FIG. 9, at operation 910, the electronic device 10 may identify a still image frame included in the moving image.

In one embodiment, while playing back a moving image, the electronic device 10 may receive an external input for stopping the playback of the moving image. In response to the external input for stopping the playback, the electronic device 10 may stop the playback of the moving image while displaying the still image frame output on the display (e.g., display 11 in FIG. 1). The electronic device 10 may identify the still image frame output on the display 11 while the playback of the moving image is stopped as a still image frame to be used for obtaining the first information.

At operation 920, the electronic device 10 may transmit the identified still image frame to the server 20.

For example, the electronic device 10 may transmit the server 20 the identified still image frame, two to ten still image frames preceding the identified still image frame, and two to ten still image frames following the identified still image frame. Alternatively, the electronic device 10 may transmit the server 20 the moving image together with the identified still image frame.

At operation 930, the server 20 may obtain the first information from the received still image frame.

For example, the server 20 may obtain the first information by performing scene recognition on the received still image frame. Alternatively, the server 20 may detect an object or person in motion as the first information by analyzing the received still image frame, two to ten still image frames preceding the received still image frame, and two to ten still image frames following the identified still image frame.

At operation 940, the server 20 may transmit the obtained first information to the electronic device 10.

At operation 950, the electronic device 10 may obtain the second information from the moving image.

In one embodiment, when the server 20 receives the moving image from the electronic device 10, the server 20 may obtain the second information from the moving image and transmit the second information to the electronic device 10. In this case, the electronic device 10 may skip operation 950 for obtaining the second information from the moving image.

At operation 960, the electronic device 10 may identify at least one image related function by using at least one of the first information or the second information.

At operation 970, the electronic device 10 may display at least one function execution object for executing the identified image related function.

Figure 10:
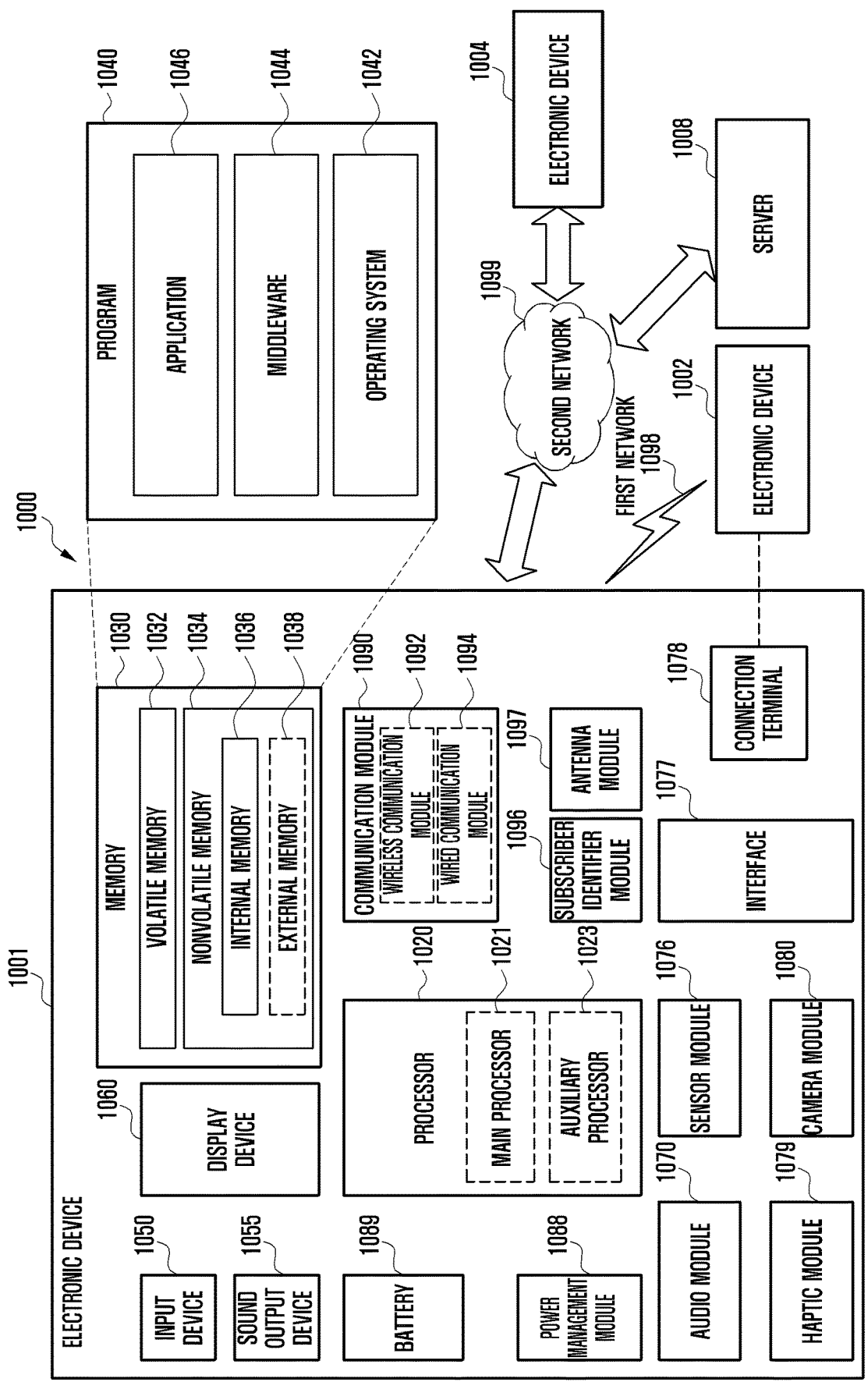
FIG. 10 is a block diagram of an electronic device in a network environment according to an embodiment of the disclosure.

FIG. 10 is a block diagram of an electronic device in a network environment according to an embodiment of the disclosure.

Referring to FIG. 10, an electronic device 1001 in a network environment 1000 may be implemented by the electronic device illustrated in FIG. 1. The electronic device 1001 may communicate with another electronic device 1002 via a first network 1098 (e.g., a short-range wireless communication network), or an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In some embodiments, at least one (e.g., the display device 1060 or the camera module 1080) of the components may be omitted from the electronic device 1001, or one or more other components may be added in the electronic device 1001. In some embodiments, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may load a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a CPU or an AP), and an auxiliary processor 1023 (e.g., a graphics processing unit (GPU), an image signal processor (ISP), a sensor hub processor, or a CP) that is operable independently from, or in conjunction with, the main processor 1021. Additionally or alternatively, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an OS 1042, middleware 1044, or an application 1046.

The input device 1050 may receive a command or data to be used by another component (e.g., the processor 1020) of the electronic device 1001, from the outside (e.g., a user) of the electronic device 1001. The input device 1050 may include, for example, a microphone, a mouse, a keyboard, or a digital pen (e.g., a stylus pen).

The sound output device 1055 may output sound signals to the outside of the electronic device 1001. The sound output device 1055 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to an embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to an embodiment, the audio module 1070 may obtain the sound via the input device 1050, or output the sound via the sound output device 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connection terminal 1078 may include a connector via which the electronic device 1001 may be physically connected with the external electronic device (e.g., the electronic device 1002). According to an embodiment, the connection terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the AP) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the SIM 1096.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., a printed circuit board (PCB)). According to an embodiment, the antenna module 1097 may include a plurality of antennas. In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

Figure 11:
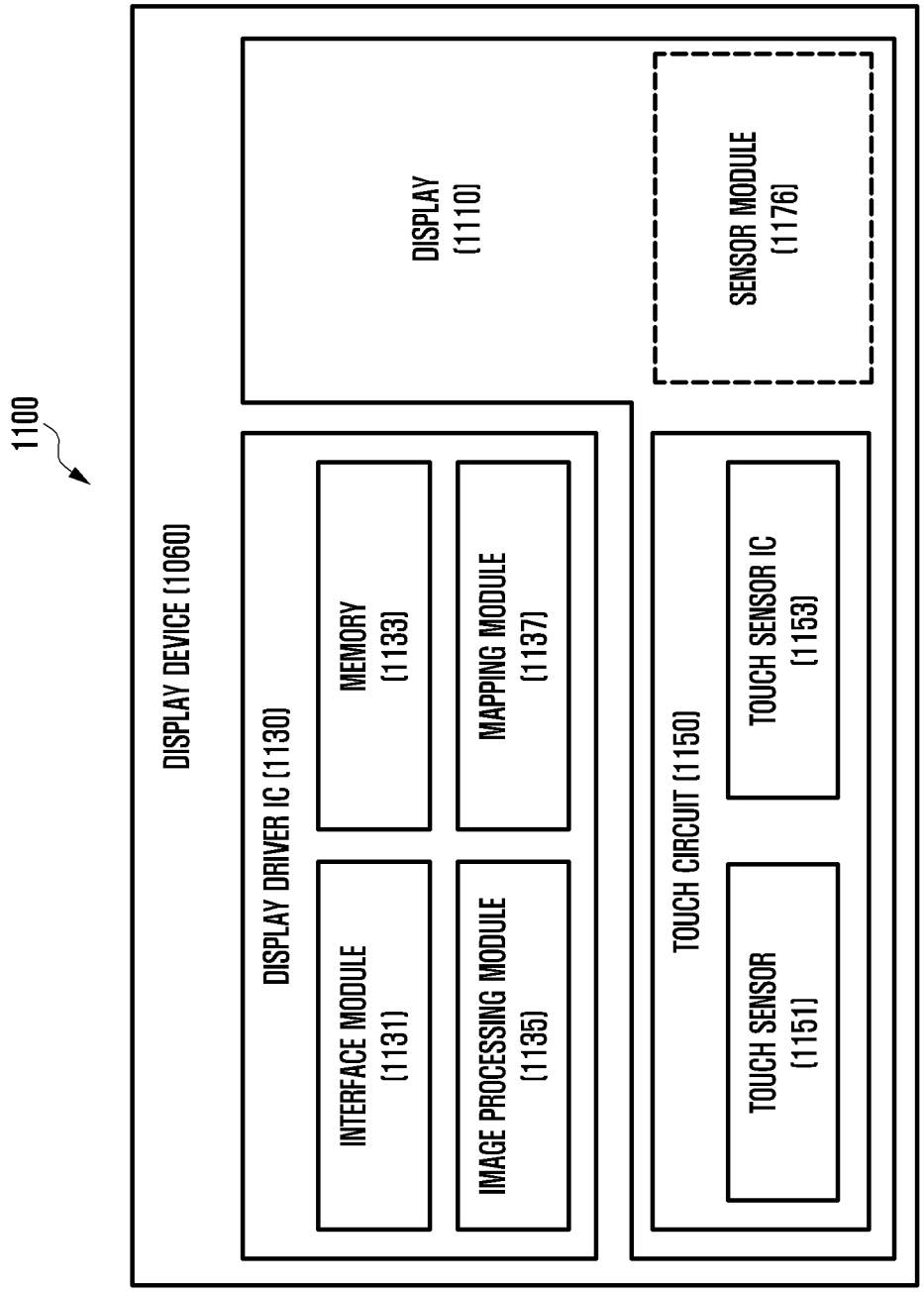
FIG. 11 is a block diagram of a display device according to an embodiment.

FIG. 11 is a block diagram of a display device according to an embodiment of the disclosure.

Referring to FIG. 11, a block diagram 1100 or an example display device 1060 is illustrated. The display device 1060 may include a display 1110 and a display driver integrated circuit (DDI) 1130 to control the display 1110. The display 1110 includes a display 11 of FIG. 1. The DDI 1130 may include an interface module 1131, memory 1133 (e.g., buffer memory), an image processing module 1135, or a mapping module 1137. The DDI 1130 may receive image information that contains image data or an image control signal corresponding to a command to control the image data from another component of the electronic device 1001 via the interface module 1131. For example, according to an embodiment, the image information may be received from the processor 1020 (e.g., the main processor 1021 (e.g., an application processor)) or the auxiliary processor 1023 (e.g., a graphics processing unit) operated independently from the function of the main processor 1021. The DDI 1130 may communicate, for example, with input device 1050 or the sensor module 1076 via the interface module 1131. The DDI 1130 may also store at least part of the received image information in the memory 1133, for example, on a frame by frame basis.

The image processing module 1135 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 1110.

The mapping module 1137 may generate a voltage value or a current value corresponding to the image data pre-processed or post-processed by the image processing module 1135. According to an embodiment, the generating of the voltage value or current value may be performed, for example, based at least in part on one or more attributes of the pixels (e.g., an array, such as a red, green, and blue (RGB) stripe or a pentile structure, of the pixels, or the size of each subpixel). At least some pixels of the display 1110 may be driven, for example, based at least in part on the voltage value or the current value such that visual information (e.g., a text, an image, or an icon) corresponding to the image data may be displayed via the display 1110.

According to an embodiment, the display device 1060 may further include a touch circuit 1150. The touch circuit 1150 may include a touch sensor 1151 and a touch sensor integrated circuit (IC) 1153 to control the touch sensor 1151. The touch sensor IC 1153 may control the touch sensor 1151 to sense a touch input or a hovering input with respect to a certain position on the display 1110. To achieve this, for example, the touch sensor 1151 may detect (e.g., measure) a change in a signal (e.g., a voltage, a quantity of light, a resistance, or a quantity of one or more electric charges) corresponding to the certain position on the display 1110. The touch circuit 1150 may provide input information (e.g., a position, an area, a pressure, or a time) indicative of the touch input or the hovering input detected via the touch sensor 1151 to the processor 1020. According to an embodiment, at least part (e.g., the touch sensor IC 1153) of the touch circuit 1150 may be formed as part of the display 1110 or the DDI 1130, or as part of another component (e.g., the auxiliary processor 1023) disposed outside the display device 1060.

According to an embodiment, the display device 1060 may further include at least one sensor (e.g., a fingerprint sensor, an iris sensor, a pressure sensor, or an illuminance sensor) of the sensor module 1176 or a control circuit for the at least one sensor. In such a case, the at least one sensor or the control circuit for the at least one sensor may be embedded in one portion of a component (e.g., the display 1110, the DDI 1130, or the input device 1050)) of the display device 1060. For example, when the sensor module 1176 embedded in the display device 1060 includes a biometric sensor (e.g., a fingerprint sensor), the biometric sensor may obtain biometric information (e.g., a fingerprint image) corresponding to a touch input received via a portion of the display 1110. As another example, when the sensor module 1176 embedded in the display device 1060 includes a pressure sensor, the pressure sensor may obtain pressure information corresponding to a touch input received via a partial or whole area of the display 1110. According to an embodiment, the touch sensor 1151 or the sensor module 1176 may be disposed between pixels in a pixel layer of the display 1110, or over or under the pixel layer.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

In one embodiment, the computer program product may include a computer readable storage medium that contains one or more instructions configured to: obtain first information from a still image frame included in a moving image; obtain second information from the moving image; identify at least one image related function by using at least one of the first information or the second information; and display at least one function execution object on the display for executing the identified image related function.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   at least one processor; and
   at least one memory configured to store instructions that cause the at least one processor to:
   obtain information for a scene recognition result from a still image frame of a moving image, the scene recognition result comprising one of a human recognition result of recognizing a person included in the still image frame, an object recognition result of recognizing a shape included in the still image frame, a place recognition result of recognizing a geographical region included in the still image frame, or a movement recognition result of the human or the object detected in the still image frame, determine, among a plurality of image functions related to the moving image, at least one image function based on the information for the scene recognition result, wherein the plurality of image functions include an image correction function, a text input function, a graphics interchange format (GIF) generation function, an image generation function, and an icon recommendation function, control the display to display at least one function execution object corresponding to the determined at least one image function, and execute, in response to detecting an input for selecting a function execution object of the at least one function execution object, an image function corresponding to the selected function execution object.

2. The electronic device of claim 1, wherein the instructions are further configured to cause the at least one processor to:

control the display to playback the moving image, in response to an input for stopping the playback, stop the playback of the moving image at the still image frame and display the still image frame.

3. The electronic device of claim 2, wherein the at least one function execution object includes at least one of an image correction execution object corresponding to the image correction function, a text input execution object corresponding to the text input function, a GIF generation execution object corresponding to the GIF generation function, an image generation execution object corresponding to the image generation function, or an icon recommendation execution object corresponding to the icon recommendation function, wherein, when the information on the human recognition result is obtained, the determined at least one image function includes the image correction function and the image generation function, wherein, when the information on the object recognition result is obtained, the determined at least one image function includes the icon recommendation function, wherein, when the information on the place recognition result is obtained, the determined at least one image function includes the text input function, and wherein, when the information on the movement recognition result is obtained, the determined at least one image function includes the image generation function and the GIF generation function.

4. The electronic device of claim 3, wherein the instructions are further configured to cause the at least one processor to:

in response to an input for selecting the image correction execution object, apply an image correction function to the still image frame and generate a corrected image frame, and control the display to display the corrected image frame, and wherein the image correction execution object comprises a portrait correction execution object to correct a face of a person in the still image frame, and wherein the portrait correction execution object including at least one of an intensity correction object, an eye correction object, a face correction object, or a skin tone correction object.

5. The electronic device of claim 3, wherein the instructions are further configured to cause the at least one processor to:

in response to an input for selecting the image correction execution object, apply an image correction function to the moving image and generate a second moving image, and control the display to display the second moving image.

6. The electronic device of claim 3, wherein the instructions are further configured to cause the at least one processor to:

control the display to display, in response to an input for selecting the text input execution object, a text input box, generate, in response to an input for selecting the GIF generation execution object, a GIF file based on the still image frame, extract, in response to an input for selecting the image generation execution object, a plurality of still image frames from the moving image based on the information, and generate a second moving image based on the plurality of still image frames, and control the display to display, in response to an input for selecting the icon recommendation execution object, one or more selectable icons.

7. The electronic device of claim 3, further comprising a communication circuit, and wherein the instructions are further configured to, in response to an input for selecting the image generation execution object, cause the at least one processor to:

control the communication circuit to transmit the still image frame to a server, control the communication circuit to receive one or more still image frames that are selected by the server based on the still image frame, and generate a second moving image based on the one or more still image frames and the still image frame.

8. The electronic device of claim 3, wherein the instructions are further configured to cause the at least one processor to:

identify a non-verbal communication in the still image frame, identify a plurality of graphical objects corresponding to the non-verbal communication, display the plurality of graphical objects, and generate, in response to an input onto a first graphical object from the plurality of graphical objects, a second still image frame including the first graphical object.

9. The electronic device of claim 3, wherein the instructions are further configured to cause the at least one processor to:

identify that a subject of the still image frame is performing a continuous action, identify a plurality of image frames from the moving image corresponding to the continuous action, and generate a second moving image based on the plurality of image frames and the still image frame.

10. The electronic device of claim 3, wherein the instructions are further configured to cause the at least one processor to:
  identify a person in the still image frame,
  identify a plurality of still image frames, in which the identified person is present, from the moving image based on identification of the person, and
  generate a second moving image based on the plurality of still image frames in which the identified person is present and the still image frame.

11. The electronic device of claim 1, wherein the instructions are further configured to cause the at least one processor to, in response to a user input, control the display to display a shortcut function execution object associated with the function execution object.

12. The electronic device of claim 1, wherein the information further includes at least one of a shooting time of the still image frame, or a comparison result between the still image frame and still image frames preceding or following the still image frame.

13. The electronic device of claim 9, wherein the instructions are further configured to cause the at least one processor to:
  obtain second information includes at least one of a shooting time, a shooting location, a playback duration, a shooting format, a file name, a resolution, codec information, or a frame rate of the moving image; and
  determine a quantity of the plurality of image frames based on the second information.

14. A method for controlling by an electronic device, the method comprising:
  obtaining information for a scene recognition result from a still image frame of a moving image, the scene recognition result comprising one of a human recognition result of recognizing a person included in the still image frame, an object recognition result of recognizing a shape included in the still image frame, a place recognition result of recognizing a geographical region included in the still image frame, or a movement recognition result of the human or the object detected in the still image frame;
  determining, among a plurality of image functions related to the moving image, at least one image function based on the information for the scene recognition result, wherein the plurality of image functions include an image correction function, a text input function, a graphics interchange format (GIF) generation function, an image generation function, and an icon recommendation function;
  displaying at least one function execution object corresponding to the determined at least one image function; and
  executing, in response to detecting an input for selecting a function execution object of the at least one function execution object, an image function corresponding to the selected function execution object.

15. The method of claim 14, further comprising:
  displaying playback of the moving image; and
  in response to an input for stopping the playback, stopping the playback of the moving image and displaying the still image frame.

16. The method of claim 15,
  wherein the at least one function execution object includes at least one of an image correction execution object corresponding to the image correction function, a text input execution object corresponding to the text input function, a GIF generation execution object corresponding to the GIF generation function, an image generation execution object corresponding to the image generation function, or an icon recommendation execution object corresponding to the icon recommendation function,
  wherein, when the information on the human recognition result is obtained, the determined at least one image function includes the image correction function and the image generation function,
  wherein, when the information on the object recognition result is obtained, the determined at least one image function includes the icon recommendation function,
  wherein, when the information on the place recognition result is obtained, the determined at least one image function includes the text input function, and
  wherein, when the information on the movement recognition result is obtained, the determined at least one image function includes the image generation function and the GIF generation function.

17. The method of claim 16, further comprising:
  in response to an input for selecting the image correction execution object, applying an image correction function to the still image frame and generating a corrected still image frame; and
  displaying the corrected still image frame.

18. The method of claim 16, further comprising, in response to an input for selecting the text input execution object, displaying a text input box on a display.

19. The method of claim 16, further comprising, in response to an input for selecting the GIF generation execution object, generating a GIF file by using a plurality of still image frames based on the still image frame.

20. The method of claim 16, further comprising:
  in response to an input for selecting the image generation execution object, extracting a plurality of still image frames from the moving image based on the information; and
  generating a second moving image.

* * * * *